United States Patent [19]

Olbrich et al.

[11] Patent Number: 4,695,613

[45] Date of Patent: Sep. 22, 1987

[54] POWDER VARNISH COMPOSITIONS CONTAINING CARBOXY CURING AGENTS

[75] Inventors: Juergen Olbrich, Dorsten; Uwe Biethan, Marl; Gernold Sorge, Herne, all of Fed. Rep. of Germany

[73] Assignee: Huels Aktiengesellschaft, Marl, Fed. Rep. of Germany

[21] Appl. No.: 778,658

[22] Filed: Sep. 23, 1985

[30] Foreign Application Priority Data

Sep. 22, 1984 [DE] Fed. Rep. of Germany ....... 3434917

[51] Int. Cl.$^4$ .................... C08G 59/14; C08G 59/16; C08L 63/00
[52] U.S. Cl. .................... 525/533; 524/602; 525/438; 528/114; 528/117; 528/289; 560/35
[58] Field of Search ................ 524/602; 525/438, 533; 528/289, 114, 117

[56] References Cited

U.S. PATENT DOCUMENTS

| | | | |
|---|---|---|---|
| 4,007,299 | 2/1977 | Schülde et al. | 525/934 X |
| 4,223,097 | 9/1980 | Johannes et al. | 525/438 X |
| 4,411,955 | 10/1983 | Mondt et al. | 525/438 X |
| 4,424,313 | 1/1984 | Meyer et al. | 528/289 X |
| 4,459,392 | 7/1984 | Arai et al. | 528/289 X |
| 4,496,710 | 1/1985 | Gude et al. | 528/114 |
| 4,510,288 | 4/1985 | Meyer et al. | 525/533 X |

*Primary Examiner*—Lucille M. Phynes
*Attorney, Agent, or Firm*—Millen & White

[57] ABSTRACT

Curing agents which contain carboxy groups, obtained by partial neutralization of an oligoester having an acid number in the range from 245 to 265 with a cyclic amidine, for epoxy-group-containing powder coating compositions to produce matte coatings.

30 Claims, No Drawings

POWDER VARNISH COMPOSITIONS CONTAINING CARBOXY CURING AGENTS

BACKGROUND OF THE INVENTION

This invention relates to a curing agent for powder coating compositions based on epoxy resin binders, the agent being obtained by neutralization of a polycarboxylic acid.

There is a great need for powder-type varnishes for the production of matte coatings, especially in the field of industrial varnishes. The reasons for this are predominantly of a practical kind. Textured and/or matte surfaces require far less cleaning than glossy surfaces. Moreover, it is necessary for reasons of safety to avoid strongly reflective surfaces.

In order to attain the desired effect, a number of measures have become known. For producing matte coatings based on epoxy resins as the binders, the use of special curing agents has proven to be an advantageous mode of operation (see German Pat. No. 2,324,696 which disclosure is being incorporated by reference herein). One disadvantage of the process described therein resides in relatively high curing temperatures (180°–210°C.) when used under practical conditions.

SUMMARY OF THE INVENTION

It is an object of the present invention to develop curing agents for powder coating compositions permitting curing at lower temperatures than those required with prior art agents, and eliminating or ameliorating prior art drawbacks, while not impairing the properties of the coatings desirable in varnishes.

Upon further study of the specification and appended claims, further objects and advantages of this invention will become apparent to those skilled in the art.

These objects have been attained by providing a curing agent which contains carboxy groups, obtained by neutralization of a polycarboxylic acid with a cyclic amidine. The agent is useful in powder coating compositions based on an epoxy resin as the binder. This curing agent may be obtained by conventionally reacting a carboxy-group-containing oligoester having an acid number in the range from 245 to 265 with one or several cyclic amidines, wherein from >25% to 90% of the free carboxy groups have been neutralized.

DETAILED DESCRIPTION OF THE INVENTION

Aliphatic, cycloaliphatic or aromatic, monomolecular dicarboxylic or polycarboxylic acids (preferably saturated or unsaturated hydrocarbon based) and aliphatic or cycloaliphatic diols may be used to produce the oligoesters. The carboxylic acids and diols each contain 4–18 carbon atoms and also are preferbly hydrocarbon based. In the case of the diols, up to 7 carbon atoms can also be optionally substituted by an oxa atom, provided that such oxygen atoms are separated by at least 2 carbon atoms from the hydroxy group and/or from another oxygen atom in the chain.

Suitable dicarboxylic acids include, for example, succinic acid, glutaric acid, adipic acid, trimethyladipic acid, azelaic acid, sebacic acid, decanedicarboxylic acid, dodecanedicarboxylic acid, fumaric acid, maleic acid and isophthalic acid. Suitable polycarboxylic acids include, for example, benzene-1,3,5-tricarboxylic acid, benzene-1,2,4-tricarboxylic acid, benzene-1,2,3-tricarboxylic acid, naphthalene-1,5-dicarboxylic acid, benzophenone-4,4'-dicarboxylic acid, butanetetracarboxylic acid, cyclopentanetetra-carboxylic acid, pyromellitic acid, benzene-1,2,3,4-tetracarboxylic acid, benzene-1,2,3,5-tetracarboxylic acid and 3,4-dicarboxy-1,2,3,4-tetrahydronaphthalene-1-succinic acid.

Diols include, for example, 1,3-, 1,4- or 2,3-butanediol, 1,5-pentanediol, 2,2-dimethyl-1-, 3-propanediol, 1,6-and 2,5-hexanediol, 1,12-dodecanediol, or similar compounds.

The carboxy-group-containing oligoesters have an acid number of about 245–265, especially 250–260.

The acid number is determined according DIN 53 402. The softening points are generally in the range of about 40°–110° C., preferably in the range of 60°–90° C. Their number average molecular weight is typically below about 2,500. (Molecular weight is determined with the aid of methods of exclusion chromatography).

The production of the oligoesters is conventional and is described in Sorensen and Campbell, "Preparative Methods of Polymer Chemistry", Interscience Publishers, Inc., New York, 1961, pp. 111–127 which disclosure is incorporated by reference herein. In general, the oligoesters are prepared at temperatures of up to about 200° C. by customary melt condensation. The course of the reaction can be controlled by titration of the excess carboxy groups so that the end of the reaction can be readily determined.

The usual cyclic amidines can be employed for the neutralization of the carboxy-group-containing oligoesters. See e.g., Houben/Weyl/Müller—Methoden der organischen Chemie Vol. XI/2, p. 38–69, Thieme-Verlag-Stuttgart (1958), which disclosure is incorporated by reference herein. Typically these are of 5–7 ring atoms and are optionally C-or N- substituted.

Especially suitable as cyclic amidines are imidazolines or tetrahydropyrimidines.

Suitable imidazolines include compounds of the general formula

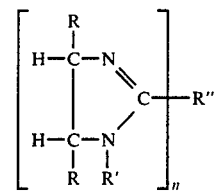

wherein
each R independently is hydrogen, $C_{1-6}$ alkyl, $C_{5-10}$ cycloalkyl, $C_{7-12}$ aralkyl, $C_{6-15}$ aryl, or a $C_{5-10}$ heterocycle which contains 1-2 in total of oxygen, nitrogen and sulfur atoms, there generally being 5–7 atoms in each ring and 1–2 rings in total,
R' is hydrogen, $C_{1-6}$ alkyl, $C_{6-15}$ aryl, $C_{5-10}$ cycloalkyl, or a heterocyclic residue as defined above,
R" is $C_{1-6}$ -alkyl or -alkylene, or $C_{6-15}$ -aryl or -arylene, wherein each may be substituted by $C_{1-6}$ alkyl, $C_{5-10}$ cycloalkyl or $C_{6-15}$ aryl,
n is 1 or 2,
and, where n=1, R" can also be hydrogen.

Preferred imidazolines include, for example, 2-phenylimidazoline, 2-phenyl-4-methylimidazoline, 2-(m-tolyl)-4-methylimidazoline, 2-(m-pyridyl) imidazoline, 1,4-tetramethylenebis(4-methylimidazoline), 2-methylimidazoline, 2,4-dimethylimidazoline, 2-ethylimidazoline, 2-ethyl-4-methyl-imidazoline, 2-benzylimidazoline, 2-(o-tolyl)imidazoline, 2-(p-tolyl) imidazoline, tetramethylenebis(imidazoline), 1,1,3-trimethyl-1,4-tetramethylenebisimidazoline, 1,1,3-trimethyl-1,4-tetramethylenebis(4-methylimidazoline), 1,3,3-trimethyl-1-1,4-tetramethylenebis(4-methylimidazoline), 1,2-phenylenebisimidazoline, 1,3-phenylenebis(4-methylimidazoline). Mixtures of imidazolines can also be employed; mixtures of 2-phenylimidazoline and 2-methylimidazoline are especially preferred.

Cyclic amidines also include tetrahydropyrimidines of the formula

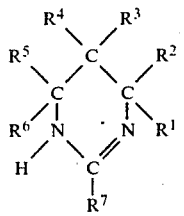

wherein $R^1$ to $R^7$ are each independently hydrogen, $C_{1-6}$ alkyl, $C_{5-10}$ cycloalkyl, $C_{7-12}$ aralkyl, or $C_{6-15}$ aryl, wherein two geminal or vicinal substituents can optionally form, together with the carbon atoms to which they are attached, a cycloaliphatic ring of 5–6 carbon atoms.

Preferred tetrahydropyrimidines are, for example, 2-methyltetrahydropyrimidine, 2,4-, 2,5- and 2,6-dimethyltetrahydropyrimidine, 2-ethyltetrahydropyrimidine, 2-ethyl-4-methyltetradhyropyrimidine, 2-benzyltetrahydropyrimidine, 2-phenyltetrahydropyrimidine, 2-phenyl-4-methyl-, -5-methyl- and -6-methyltetrahydropyrimidine, 2,4-diaza-3-phenyl-7,9,9- and -7,7,9-trimethyl-bicyclo-[4.3.0]nonene-2, 2,4-diaza-3-methyl-7,9,9-and 7,7,9-trimethylbicyclo[4.3.0]nonene-2, as well as mixtures thereof.

The curing agents of this invention are produced by reacting the carboxy-group-containing oligoester with the cyclic amidine. The mixture ratio of the two components is selected so that more than 25% to 90%, preferably 28–50%, of the free carboxy groups of the oligoester are neutralized.

The reaction can take place, for example, at 120° C. in the melt of by coextrusion of the components. The reaction procedure as such is known, and is disclosed in Sorensen and Campbell—Preparative Methods of Polymer Chemistry—Interscience Publishers Inc., N.Y. (1961), which disclosure is being incorporated by reference herein.

The epoxy resins that can be employed generally have more than one epoxy group per molecule, and a melting point above about 40° C. The epoxy resins can be saturated, unsaturated, aliphatic, cycloaliphatic, araliphatic or heterocyclic. Suitable epoxy resins include:

epoxides of polyunsaturated hydrocarbons, for example, vinylcyclohexene, dicyclopentadiene, 1,3-cyclohexadiene and 1,4-cyclohexadiene, cyclododecadienes and -trienes, isoprene, 1,5-hexadiene, butadiene, polybutadienes, or divinylbenzenes, epoxy ethers of polyhydric alcohols, for example, ethylene, propylene and butylene glycol, glycerol, pentaerythirtol, sorbitol, polyvinyl alcohols, and thiodiglycols, epoxy ethers of polyvalent phenols, for example, resorcinol, hydroquinone, bis(4-hydroxyphenyl)methane, bis(4-hydroxy-3,5-dichlorophenyl)methane, 1,1-bis (4-hydroxyphenyl)ethane, 2,2-bis(4-hydroxyphenyl)propane, 2,2-bis(4-hydroxy-3-methylphenyl)-propane, 2,2-bis(4-hydroxy-3,5, 5-trichlorophenyl)propane, bis(4-hydroxyphenyl) phenylmethane, bis(4-hydroxyphenyl)-diphenylmethane, bis(4-hydroxyphenyl)cyclohexylmethane, 4,4′-dihydroxydiphenyl, or 2—2-dihydroxydiphenyl, N-containing epoxides, for example, N,N-diglycidylaniline, N,N′dimethyldiglycidyl-4,4′-diaminodiphenylmethane, triglycidyl isocyanurate.

Especially suitable are epoxides based on bisphenol-A with an epoxide equivalent of about 500–2,000 and with a melting point of about 70°–140° C.

It is furthermore possible to use customary additives in the production of the powder coating compositions, such as levelling agents, pigments, dyes, fillers, catalysts, thixotropic acents, UV stabilizers and antioxidants. The amount of these additives can vary within a wide range, based on the amount of binder, e.g., typically 10–90 weight %.

The coating compositions can be prepared, for example, by grinding the individual components (epoxy resins, curing agents and optional additives), mixing same, and extruding same at 90°–110° C. After extrusion, the product is cooled and ground to a particle size smaller than 100 μm.

Application onto the substrates to be coated can take place according to methods known per se, for example by electrostatic powder coating, fluidized-bed coating, or electrostatic fluidized-bed coating. Subsequently the thus-applied coating composition is cured for 5–35 minutes in a temperature range between 130° and 220° C., preferably for 15–30 minutes between 140° and 180° C.

Any substrates stable under the indicated curing temperatures are suited for being coated with the powder coating compositions of this invention, e.g., metals, glass, ceramic materials, or synthetic resins.

The coatings prepared with the aid of the curing agents of this invention exhibit a uniform structure and a matte gloss. In accordance with the analytical method by Gardner at 60°,(ASTM D 523), gloss degrees in a range from 12 to 85 can be provided. Unexpectedly, other properties relevant to varnish technology remain at a high level.

Unless indicated otherwise herein, all details of the formation, structure and use of the curing agent of this invention are fully conventional, e.g., as disclosed in S. T. Harris—The Technology of Powder Coatings, Portendis Press, London (1976), which disclosure is incorporated by reference herein.

The properties relevant to varnish technology were determined with the aid of the testing methods set out below:

Erichsen depression in mm (DIN 53 156)
Impact test (ASTM D 27/94/69)
Crisscross cut test (DIN 53 151)
Degree of gloss according to Gardner at 60° (ASTM D 523)

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Preparation of the Coating Compositions

The epoxy resins employed were mixed with the curing agents of this invention, the pigments, and the additives, such as levelling agents, for example, in the weight ratios set out below, extruded, and subsequently ground up. The particle diameter of the powder varnish ingredients was <100 μm. The frequency distribution of the particle diameters was at a maximum in the range from 30 to 50 μm. These coating compositions were applied to degreased steel sheets (1 mm) by electrostatic powder spray coating and then cured at the indicated temperatures and time periods. The properties of the resultant coatings were made the subjects of the tests described below.

EXAMPLE 1

At 200° C., an oligoester having an acid number of 257 and a softening point of 67° C. was prepared by melt condensation from 0.5 mole of 1,6-hexanediol, 1.5 moles of neopentyl glycol, 1.8 moles of phthalic anhydride and 1.2 moles of trimellitic anhydride. This oligoester was then reacted in the melt with 1 mole of 2-phenylimidazoline at 120° C. within one hour.

The curing agent was processed into a powder coating composition with titanium dioxide, epoxy resin and levelling agent, in the ratio set out below. The resultant coating composition is applied to steel sheets as described above.

11.0% by weight of curing agent
47.8% by weight of epoxy resin (DER 663 u)
40.0% by weight of TiO₂
1.0% by weight of levelling agent on polyacrylate basis ("MODAFLOW")
0.2% by weight of benzoin The test results can be seen from Table 1.

EXAMPLE 2

An oligoester was produced in correspondence with Example 1 and then reacted at 120° C. in an extruder (Buss co-kneader) with 1 mole of 2-phenylimidazoline.

Preparation and processing of the powder coating composition took place analogously to Example 1.

The test results can be derived from Table 2.

EXAMPLE 3

Corresponding to Example 1, an oligoester was prepared and then partially neutralized in the melt at 120° C. with 0.5 mole of 2-phenylimidazoline. The curing agent was processed with titanium dioxide, epoxy resin and levelling agent into a powder coating composition in the ratio disclosed below. The coating composition is applied to steel sheets as described above.

17.4% by weight of curing agent
41.4% by weight of epoxy resin (DER 663 u)
40.0% by weight of TiO₂
1.0% by weight of levelling agent on polyacrylate basis ("MODAFLOW")
0.2% by weight of benzoin The test results are set forth in Table 3.

EXAMPLE 4

Analogously to Example 1, an oligoester was produced and then partially neutralized in the melt at 120° C. with 2 moles of 2-phenylimidazoline. This curing agent was processed into a powder coating composition with titanium dioxide, epoxy resin and levelling agent in the ratio set forth below. The coating composition is applied to steel sheets as set out above.

6.13% by weight of curing agent
52.67% by weight of epoxy resin (DER 663 u)
40.00% by weight of TiO₂
1.00% by weight of levelling agent on polyacrylate basis ("MODAFLOW")
0.20% by weight of benzoin The test results can be taken from Table 4.

EXAMPLE 5

An oligoester having an acid number of 254 and a softening point of 82.5° C. was prepared at 200° C. by melt condensation from 0.5 mole of hydroxypivalic acid neopentyl glycol ester, 1.5 moles of neopentyl glycol, 1.5 moles of phthalic anhydride and 1.5 moles of trimellitic anhydride. This oligoester was then reacted within one hour at 120° C. with 1 mole of 2-phenylimidazoline. The curing agent was processed into a powder coating composition with titanium dioxide, epoxy resin and levelling agent in the ratio set forth below. The coating composition is applied to steel sheets as disclosed above.

12.73% by weight of curing agent
46.07% by weight of epoxy resin (DER 663 u)
40.00% by weight of TiO₂
1.00% by weight of levelling agent on polyacrylate basis ("MODAFLOW")
0.20% by weight of benzoin The test results can be derived from Table 5.

TABLE 1

| Test | Baking Conditions [min]/[°C.] | Coating Thickness [μm] | Depression [mm] | Impact Test | Crisscross Cut | Gloss [60°] |
| --- | --- | --- | --- | --- | --- | --- |
| 1/I | 20/180 | 76–78 | 7.4 | 128 | 0 | 25 |
| 1/II | 20/160 | 84–96 | 7.4 | 116 | 0 | 27 |
| 1/III | 30/140 | 64–78 | 7.4 | 112 | 0 | 28 |
| 1/IV | 30/130 | 58–70 | 7.5 | 64 | 0 | 28 |

TABLE 2

| Test | Baking Conditions [min]/[°C.] | Coating Thickness [μm] | Depression [mm] | Impact Test | Crisscross Cut | Gloss [60°] |
| --- | --- | --- | --- | --- | --- | --- |
| 2/I | 20/180 | 48–62 | 7.7 | >160 | 0 | 25 |
| 2/II | 20/160 | 50–58 | 7.9 | >160 | 0 | 25 |
| 2/III | 30/140 | 50–54 | 8.4 | 132 | 0 | 27 |
| 2/IV | 30/130 | 50–52 | 7.8 | 108 | 0 | 28 |

TABLE 3

| Test | Baking Conditions [min]/[°C.] | Coating Thickness [μm] | Depression [mm] | Impact Test | Crisscross Cut | Gloss [60°] |
| --- | --- | --- | --- | --- | --- | --- |
| 3/I | 20/180 | 42–52 | 8.0 | 116 | 0–1 | 64 |
| 3/II | 20/160 | 48–50 | 7.7 | 120 | 0–1 | 62 |
| 3/III | 20/140 | 48–61 | 7.6 | 100 | 0 | 61 |

TABLE 4

| Test | Baking Conditions [min]/[°C.] | Coating Thickness [μm] | Depression [mm] | Impact Test | Crisscross Cut | Gloss [60°] |
| --- | --- | --- | --- | --- | --- | --- |
| 4/I | 20/180 | 50–68 | 7.8 | >160 | 0 | 82 |
| 4/II | 20/160 | 54–68 | 7.9 | >160 | 0 | 84 |
| 4/III | 30/140 | 52–58 | 8.3 | >160 | 0 | 85 |

TABLE 5

| Test | Baking Conditions [min]/[°C.] | Coating Thickness [μm] | Depression [mm] | Impact Test | Crisscross Cut | Gloss [60°] |
| --- | --- | --- | --- | --- | --- | --- |
| 5/I | 20/180 | 66–74 | 8.1 | 156 | 0 | 12 |
| 5/II | 20/160 | 86–90 | 7.8 | 104 | 0 | 13 |
| 5/III | 30/140 | 76–80 | 8.1 | 112 | 0 | 15 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for curing an epoxy resin composition, comprising heating a mixture comprising the resin and an effective amount of a curing agent, which curing agent is the neutralization product of a polycarboxylic acid precursor and a cyclic amidine, the improvement wherein the polycarboxylic acid precursor is an oligoester which is the product of a $C_{4-18}$ hydrocarbon, aliphatic cycloaliphatic or aromatic-polycarboxylic or -dicarboxylic acid and a $C_{4-8}$ hydrocarbon aliphatic or cycloaliphatic diol, said oligoester having an acid number of about 245–265, and wherein in said polycarboxylic acid product >25% to 90% of the free carboxy groups in the oligoester are neutralized by said cyclic amidine.

2. A process accoding to claim 1, wherein the amount of the curing agent is not more than 17.4%.

3. A process according to claim 1, wherein the oligoester has a softening point of about 40°–110° C.

4. A process according to claim 1, wherein the oligoester has a softening point of about 60°–90° C.

5. A process according to claim 1, wherein the oligoester has a number average molecular weight less than about 2,500.

6. A process according to claim 1, wherein the diol has up to 7 C atoms substituted by O atoms, and wherein the O atoms are separated by at least 2 C atoms from hydroxy groups and additional O atoms.

7. A process according to claim 1, wherein the dicarboxylic acid is succinic acid, glutaric acid, adipic acid, trimethyladipic acid, azelaic acid, sebacic acid, decanedicarboxylic acid, dodecanedicarboxylic acid, furmic acid, maleic acid or isophathalic acid.

8. A process according to claim 1, wherein the polycarboxylic acid is benzene-1,3,5-tricarboxylic acid, benzene-1,2,4-tricarboxylic acid, benzene-1,2,3-tricarboxylic acid, naphthalene-1,5-dicarboxylic acid, benzophenone-4,4'-dicarboxylic acid, butanetetracarboxylic acid, cyclopentanetetracarboxylic acid, pyromellitic acid, benzene-1,2,3,4-tetracarboxylic acid, benzene-1,2,3,5-tetracarboxylic acid or 3,4-dicarboxy-1,2,3,4-tetrahydronaphthalene-1-succinic acid.

9. A process according to claim 1, wherein the diol is 1,3-butanediol, 1,4- butanediol 2,3-butanediol, 1,5-pentanediol, 2,2-dimethyl-1,3-propanediol, 1,6-and 2,5-hexanediol, or 1,12-dodecanediol.

10. A process according to claim 1, wherein the cyclic amidine is an imidazoline of the formula

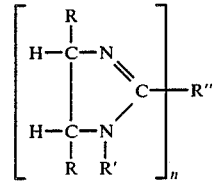

wherein
each R independently is hydrogen, $C_{1-6}$ alkyl, $C_{5-10}$ cycloalkyl, $C_{7-12}$ aralkyl, $C_{6-15}$ aryl, or a $C_{5-10}$ heterocycle which contains 1–2 in total of oxygen, nitrogen or sulfur atoms, wherein the heterocycle contains 5–7 atoms in each ring and 1–2 rings,
R' is hydrogen, $C_{1-6}$ alkyl, $C_{6-15}$ aryl, $C_{5-10}$ cycloalkyl, or a $C_{5-10}$ heterocyclic residue as defined above,
R" is $C_{1-6}$ -alkyl or $C_{2-6}$ -alkylene or $C_{6-15}$ -aryl or $C_{6-15}$ arylene wherein each may be substituted by $C_{1-6}$ alkyl, $C_{5-10}$ cycloalkyl or $C_{6-15}$ aryl,
is 1 or 2,
or where n = 1, R" can also be hydrogen.

11. A process according to claim 10, wherein the imidazoline is 2-phenylimidazoline, 2-phenyl-4- methylimidazoline, 2-(m-tolyl)-4-methyl imidazoline, 2-(m-pyridyl) imidazoline, 1,4-tetramethyl enebis(4-methylimidazoline), 2-methylimidazoline, 2,4-dimethylimidazoline, 2-ethylimidazoline, -ethyl-4-methyl-imidazoline, 2-benzylimidazoline, -(o-tolyl)imidazoline, 2-(p-tolyl) imidazoline, tetramethylenebis(imidazoline), 1,1,3- trimethyl-1,4-tetramethylenebisimidazoline, 1,1,3-trimethyl-1,4-tetramethylenebis(4-methylimidazoline), 1,3,3-trimethyl1,4-tetramethylenebis(4-mehtylimidazoline), 1,-phenylenebisimidazoline, 1,3-phenylenebis(4-methylimidazoline), or a mixture thereof.

12. A process according to claim 11, wherein the imidizoline comprises a mixture of 2-phenylimidazoline and 2-methylimidazoline.

13. A process according to claim 1, wherein the cyclic amidine is a tetrahydro-pyrimidine of the formula

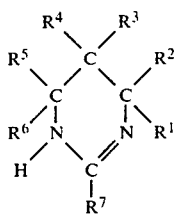

wherein $R^1$, $R^2$, $R^3$, $R^4$, $R^5$, $R^6$ or $R^7$ each independently are hydrogen, $C_{1-6}$ alkyl, $C_{5-10}$ cycloalkyl, $C_{7-12}$ aralkyl, or $C_{6-15}$ aryl, wherein two geminate and vicinal substituents can additionally form, together with the carbon atoms to which they are attached, a cycloaliphatic ring of 5-6 carbon atoms.

14. A polycarboxylic acid product according to claim 13 wherein the tetrahydropyrimidine is 2-methyltetrahydropyrimidine, 2,4-dimethyltetrahydropyrimidine, 2,5-dimethyltetrahydropyrimidine 2,6-dimethyltetrahydropyrimidine, 2-ethyltetrahydropyrimidine, 2-ethyl-4-methyltetrahyropyrimidine, 2-benzyltetrahydropyrimidine, 2-phenyltetrahydropyrimidine, 2-phenyl-4-methyl-tetrahydropyrimidine, 2-methyl-5-methyltetrahydropyrimdine, and 2-phenyl-6-methyltetrahydropyrimidine, 2,4-d aza-3-phenyl-7,9,9-trimethylbicyclo-[4.3.0]nonene-2, 2,4-diaza-3-phenyl-7,7,9-trimethylbicyclo-[4.3.0]nonene-2, 2,4-diaza-3-methyl-7,9,9-trimethyl-bicyclo[4.3.0]nonene-2, 2,4-diaza-3-methyl-7,7,9-trimethylbicyclo4.3.0]nonene-2, or a mixture thereof.

15. A process according to claim 1, wherein the cyclic amidine is an imidazoline of the formula

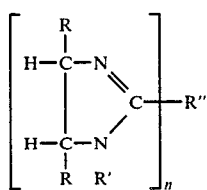

wherein
each R independently is hydrogen, $C_{1-6}$ alkyl, $C_{5-10}$ cycloalkyl, $C_{7-12}$ aralkyl, $C_{6-15}$ aryl, or a $C_{5-10}$ heterocycle which contains 1-2 oxygen nitrogen or sulfur atoms, wherein the heterocycle contains 5-7 atoms in each ring and 1-2 rings, R' is hydrogen, $C_{1-6}$ alkyl, $C_{6-15}$ aryl, $C_{5-10}$ cycloalkyl, or a $C_{5-10}$ heterocyclic residue as defined above, R" is $C_{1-6}$-alkyl or $C_{2-6}$-alkylene or $C_{6-15}$-aryl or $C_{6-15}$ arylene wherein each may be substituted by $C_{1-6}$ alkyl, $C_{5-10}$ cycloalkyl or $C_{6-15}$ aryl, N is 1 or 2, or where N=1, R" can also be hydrogen, with the proviso that R" cannot be $C_{1-6}$ alkyl-phenyl.

16. In a varnish composition comprising an epoxy resin and an effective amount of a curing agent, which curing agent is the neutralization product of a polycarboxylic acid precursor and a cyclic amidine, the improvement wherein the polycarboxylic acid precursor is an oligoester having an acid number of about 245-265 and wherein more than 25% to about 90% of the free carboxy groups of the neutralization product are neutralized and wherein said effective amount of the curing agent is not more than 17.4% by weight.

17. A composition according to claim 16 that is binder-free.

18. A composition according to claim 16, wherein the oligoester has an acid number of about 250-260.

19. A composition according to claim 16, wherein 20-50% of the carboxy groups are neutralized by the cyclic amidine.

20. A composition according to claim 16, wherein the cyclic amidine is an imidazoline of the formula wherein

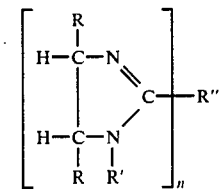

each R independently is hydrogen, $C_{1-6}$ alkyl, $C_{5-10}$ cycloalkyl, $C_{7-12}$ aralkyl, $C_{6-15}$ aryl, or a $C_{5-10}$ heterocycle which contains 1-2 in total of oxygen, nitrogen or sulfur atoms, wherein the heterocycle contains 5-7 atoms in each ring and 1-2 rings, R' is hydrogen, $C_{1-6}$ alkyl, $C_{6-15}$ aryl, $C_{5-10}$ cycloalkyl, or a $C_{5-10}$ heterocyclic residue as defined above, R" is $C_{1-6}$ -alkyl or - alkylene or $C_{6-15}$ -aryl or - arylene wherein each may be substituted by $C_{1-6}$ alkyl, $C_{5-10}$ cycloalkyl or $C_{6-15}$ aryl, n is 1 or 2, or where n=1, R" can also be hydrogen.

21. A composition according to claim 16, wherein the cyclic amidine is a tetrahydropyrimidine of the formula

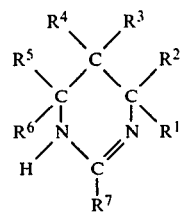

wherein $R^1$, $R^2$, $R^3$, $R^4$, $R^5$, $R^6$ or $R^7$ each independently are hydrogen, $C_{1-6}$ alkyl, $C_{5-10}$ cycloalkyl, $C_{7-12}$ aralkyl, or $C_{6-15}$ aryl, wherein two geminate and vicinal substituents can additionally form, together with the carbon atoms to which they are attached, a cycloaliphatic ring of 5-6 carbon atoms.

22. A composition according to claim 16, wherein the epoxy resin has more than one epoxy group per molecule of the resin.

23. A composition according to claim 16, wherein the epoxy resin comprises an epoxide of a polyunsaturated hydrocarbon, an epoxy ether of a polyhydric alcohol, an epoxy ether of a polyvalent phenol, or a nitrogen containing epoxide.

24. A composition according to claim 16, wherein the epoxy resin comprises an epoxide of bisphenol-A having an epoxide equivalent of about 500–2,000 and a melting point of about 70°–140° C.

25. In a process for curing an epoxy resin composition, comprising heating a mixture comprising the resin and an effective amount of a curing agent, which is the neutralization product of a polycarboxylic acid precursor and a cyclic amidine, the improvement wherein the polycarboxylic acid precursor is an oligoester having an acid number of about 245–265 and wherein more than 25% to about 90% of the free carboxy groups of the neutralization product are neutralized.

26. A process according to claim 25, wherein the oligoester has an acid number of about 250–260.

27. A process according to claim 25, wherein 28–50% of the carboxy groups are neutralized by the cyclic amidine.

28. A process according to claim 25, wherein the amount of the curing agent is not more than 17.4%.

29. In a polycarboxylic acid product useful as a curing agent for an epoxy resin and which is the neutralization product of a polycarboxylic acid precursor and a cyclic amidine, the improvement wherein the polycarboxylic acid precursor is an oligoester which is the product of a $C_{4-18}$ hydrocarbon aliphatic or cycloaliphatic diol, said oligoester having an acid number of about 245–265, and wherein in said poycarboxylic acid product >25% to 90% of the free carboxy groups in the oligoester are neutralized by said cyclic amidine.

30. A product according to claim 29, wherein the oligoester has an acid number of about 250–260.

* * * * *